United States Patent
Baumann

(10) Patent No.: US 6,281,907 B1
(45) Date of Patent: Aug. 28, 2001

(54) METHOD FOR DIMENSIONING GRAPHICAL OBJECTS DISPLAYED ON A DISPLAY DEVICE

(75) Inventor: Georg Baumann, Amberg (DE)

(73) Assignee: Autodesk, Inc., San Rafeal, CA (US)

( * ) Notice: Subject to any disclaimer, the term of this patent is extended or adjusted under 35 U.S.C. 154(b) by 0 days.

(21) Appl. No.: 09/191,919

(22) Filed: Nov. 13, 1998

(30) Foreign Application Priority Data

Nov. 18, 1997 (DE) .............................. 197 51 103

(51) Int. Cl.⁷ .................................. G02T 17/00
(52) U.S. Cl. .............................. 345/439; 345/433
(58) Field of Search .................... 345/433, 439, 345/441, 418, 419, 434, 435, 436, 437, 438, 440

(56) References Cited

U.S. PATENT DOCUMENTS 5,548,706   8/1996   Koizumi et al. .
5,655,095   8/1997   LoNegro et al. .

FOREIGN PATENT DOCUMENTS 0 736 844 A1   10/1996   (EP) .

OTHER PUBLICATIONS

Alan H. Bond and S. Zia Ahmed, 1987, "Rule–Based Automatic Dimensioning", IEEE pp. 128–135.

C. Cavagna et al., 1974, "Interactive Dimensioning of Engineering Drawings: A General Approach", pp. 35–51.

Primary Examiner—Cliff N. Vo
(74) Attorney, Agent, or Firm—Gates & Cooper LLP

(57) ABSTRACT

A method for creating a dimensioning object for at least one data object, wherein both the dimensioning object and the data object are displayable on a display device as graphical objects. Dimensioning rules (that have been pre-defined for the data object) are applied to determine a dimensioning object for the data object. The dimensioning object for the data object to be dimensioned is displayed on the display device wherein the dimensioning object is determined by the dimensioning rules. The dimensioning object is stored with the data object.

66 Claims, 5 Drawing Sheets

METHOD FOR DIMENSIONING GRAPHICAL OBJECTS DISPLAYED ON A DISPLAY DEVICE

BACKGROUND OF THE INVENTION

1. Field of the Invention.

The present invention concerns a method for the dimensioning of engineering drawings, which are preferably created using a CAD program.

2. Description of the Related Art.

Computers are increasingly used for the creation of engineering drawings. A computer typically comprises two display devices, namely a screen and a printer, a keyboard having about 100 keys, two drives for removable memory mediums, and a mouse, which can be used for moving a pointing means (cursor) on the display screen. Typically, the computer further comprises a working memory, a nonvolatile mass memory, and a processor. Special peripheral devices for the creation of engineering drawings are a tablet in connection with a pen for entering commands and drawing elements like lines or circles. Often computers are connected to a network for exchanging data with other computers.

A multitude of programs is available for the computer aided creation of engineering drawings. Simple programs require that each line and each dimension figure is entered individually. Many programs permit to combine lines to form an area and to provide the area with a hatching.

A large part of the time used for creating an engineering drawing is taken up by the dimensionings. A dimensioning comprises a dimension figure, a dimension line, and one or two auxiliary lines. Consequently a total of three to four elements must be entered. Two points must be defined for entering one line. Because of this, six points must be entered by the user for entering two auxiliary lines and one dimension line for creating one dimensioning. It is time-consuming and thus not user-friendly that the two points defining the dimension line must be located on one auxiliary line each. Therefore the user has to position the pointing means very exactly before entering these two points.

Some CAD programs therefore support the user in the creation of dimensionings by not requiring him to enter each element of the dimensioning individually. Before a dimensioning is created, it is laid down as an option in the CAD program whether the dimension and auxiliary lines are to run horizontally, vertically or diagonally. For entering one dimensioning the user has to define two points, which are to be dimensioned, using a pointing means, which may, for example, be moved using a mouse. The auxiliary lines run through these points. Furthermore, the user defines a third point using the pointing means, the dimension line running through this point. The dimension figure is determined automatically by the CAD program on the basis of the distance of the two auxiliary lines, and it is entered into the drawing at the dimension line. Consequently, in order to enter a dimensioning, the user now only has to define three points, preferably by clicking thereon, for each dimensioning.

When a dimensioning is entered in a direct, computer aided way, the dimension line is defined by entering one point only. The position of this point in the direction perpendicular to the auxiliary lines does not influence the position of the dimension line. The position of this point parallel to the auxiliary lines at most has an aesthetic significance. The point, which defines the dimension line, therefore does not have to be entered exactly, but only approximately. An only approximate positioning of the pointing means by the user can be done more quickly and therefore is more user-friendly.

However, there is still the disadvantage associated with the entering of dimensionings that the two points, which define the auxiliary lines, must be positioned exactly with respect to the body edges. Some CAD programs therefore have some snap-in grid, which can be activated, or a so-called capture function. When the snap-in grid or capture function is activated, the pointing means is moved during the entering process, i.e., for example, the mouse click, onto the line already entered. Because of this, the user again has the advantage that he only needs to position the pointing means approximately.

For entering drawing elements like, for example, lines, typically more data are required than are in fact entered. Typically only the start and end points are entered for a line. Further data like, for example, the line width, color and end points are stored as options in the program before entering the line and are then available for entering a plurality of lines. Options therefore are program settings, which are valid for a plurality of inputs and can be changed either before or after inputs.

As a rule, a plurality of drawing elements like, for example, a line, a circle or a text, are displayed on the screen completely or in part. A data structure on the working memory corresponds to each of the elements displayed on the screen. Following the method of object oriented programming, data structures are also called data objects. In this application only data objects are of interest which can be displayed on the screen as graphical objects. Normally only a small number of the data objects stored on the working memory are displayed as graphical objects because of the small dimensions of the screen. Therefore the terms "data object" and "graphical object" can often be used as synonyms.

Many CAD programs allow to combine a plurality of elements of a drawing in a group. The group then behaves like an element. All elements of a group can, for example, be moved, copied or deleted jointly. Since groups behave like elements, they can be joined with further groups or elements to even more extensive groups. Groups and elements are both called objects.

More often than not, a drawing is composed of a plurality of graphical objects. One or more drawings are located on a sheet. A plurality of sheets form a folder or a project. Most CAD programs follow this division.

SUMMARY OF THE INVENTION

The object of the present invention is to provide a method by which a dimensioning can be added to data objects defining an engineering drawing in an easy way. This object is accomplished by the subject-matter of patent claim 1. The dependent claims concern preferred embodiments of the present invention.

The dimensioning object according to the invention preferably comprises a plurality of data objects like, for example, auxiliary or dimension lines. It is created automatically on the basis of dimensioning rules. The user may influence the direction of dimensioning and the distance of the dimension lines from the data objects by positioning the pointing means. Before creating the dimensioning object, the user may select data objects by dragging the mouse, whereby a preferably rectangular region is defined on the display device. All data objects are selected whose graphical representation is located completely inside the rectangular region. Furthermore the user may influence the dimensioning object by selecting different dimensioning styles.

The points to be dimensioned are preferably determined in a two-stage process. In the first stage the contours of the data objects are analyzed, and the contour points are determined. In the second stage the points to be dimensioned are determined from the contour points. The user may influence the points to be dimensioned in the first stage by selecting the data objects and, in particular, in the second stage by moving the pointing means. After the points to be dimensioned are determined, a preliminary dimensioning is generated and displayed. The preliminary dimensioning preferably only comprises part of the final dimensioning object. On the basis of a change of position of the pointing means, the points to be dimensioned and a preliminary dimensioning are determined from the contour points again and again, such that the user may influence the preliminary dimensioning interactively. If the user accepts the dimensioning, the dimensioning object is stored together with the other data objects of the drawing.

BRIEF DESCRIPTION OF THE DRAWINGS

A preferred embodiment of the present invention will be explained in more detail in the following, referring to the enclosed drawings. In this respect, the drawings show.

DETAILED DESCRIPTION OF THE PREFERRED EMBODIMENT

Figure 1:
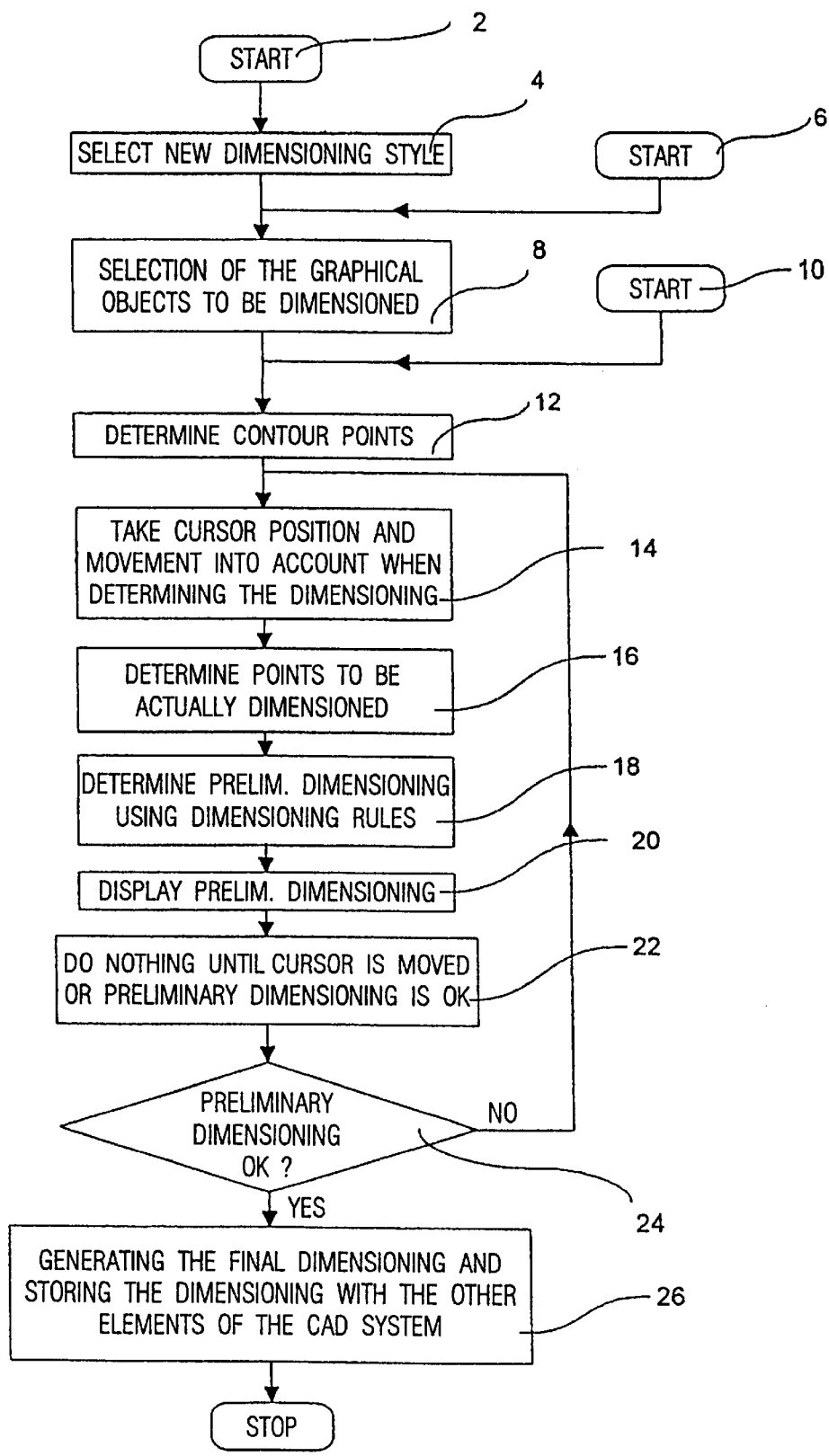
FIG. 1 is a flow chart depicting the method of the invention for the dimensioning of engineering drawings.

FIG. 1 shows a preferred embodiment of the method of the invention. The flow chart in FIG. 1 has three starting points 2, 6 and 10. This is intended to indicate that either one of the first two method steps 4 and 8 or both first method steps may be jumped over. The first method step 4 "select new dimensioning style" is explained in more detail below with reference to FIG. 5. Also method step 8 "selection of the graphical objects to be dimensioned" will be discussed below.

In method step 12 "determine contour points", the contour of the graphical objects to be dimensioned is analyzed. The possible points to be dimensioned, from which the points that are in fact to be dimensioned will be determined in method step 16, are called contour points. It will be explained in more detail in connection with FIG. 2 how the contour points are determined. The user may influence the dimensioning using a pointing means in method step 14 "take cursor position and movement into account when determining the dimensioning". A cursor, which is movable using a mouse, may be employed as a pointing means. Alternatively, the cursor may also be moved using a tablet in connection with a pen. It is further explained with reference to FIGS. 3A, 3B and 4 how the user may influence the dimensioning using the pointing means.

In method step 16, a sub-selection is made from the contour points determined in method step 12, and thus the points actually to be dimensioned are determined. That is to say, if several contour points are located on an auxiliary line, they should not be dimensioned several times. If two contour points are located on an auxiliary line, and if these are connected by a body line, then only the point closer to the dimension line will be dimensioned. Unnecessarily long auxiliary lines are avoided by this measure. If the two contour points are not connected by a line like, for example, the central points of two circles, then the point farther away from the dimension line will be dimensioned. Thereby the two points are connected by the auxiliary line. Thus the engineering drawing clearly shows that one dimension is valid for both points.

In principle the contour analysis of method step 12 could also take place in method step 16, such that the points to be actually dimensioned are determined directly from the contour analysis. Since method steps 14, 16, 18, 20 and 22 are executed cyclically, these method steps should comprise as few computing operations as possible. Thereby the execution of these method steps will be accelerated, and the display device reacts more quickly to the movement of the pointing means. Therefore the contour analysis in method step 12 for determining the contour points is not executed cyclically in the preferred embodiment of FIG. 1.

After the points to be actually dimensioned have been determined in method step 16, a "preliminary dimensioning using dimensioning rules" is determined in method step 18. In method step 20 the preliminary dimensioning is displayed. The preliminary dimensioning on the one hand shall provide the user with an idea of the appearance of the final dimensioning as accurately as possible, and on the other hand its creation again shall need as little computing power as possible. Thereby the cycle time of the steps executed cyclically is held as short as possible. If the dimensioning only comprises a few graphical objects and a powerful computer is available, then the preliminary dimensioning may comprise all elements of the final dimensioning. If the computing time for creating the preliminary dimensioning increases, then preferably the dimension figures are omitted first. The arrowheads of the dimension lines will not be calculated and displayed for reducing the computing time even further. Furthermore the preliminary dimensioning may comprise only part of the auxiliary and/or dimension lines.

If several application programs happen to run on a computer at the same time, then no application should put an unnecessary load on the computer system in order not to slow down the other applications unnecessarily. This is the objective of method step 22. As long as the pointing means is not moved, it is not necessary to execute method steps 14, 16, 18 and 20 and to display the same preliminary dimensioning again and again.

It is checked in method step 24 whether the user agrees with the preliminary dimensioning. If the user changes the position of the pointing means, then he obviously is not yet satisfied with the preliminary dimensioning. Therefore a further preliminary dimensioning is generated in method steps 14, 16, 18 and 20. If the user finally agrees with the final dimensioning indicated by the preliminary dimensioning, he indicates this to the computer. Preferably this takes place by pressing a key or a combination of keys, in particular by pressing the return key.

Figure 3A:
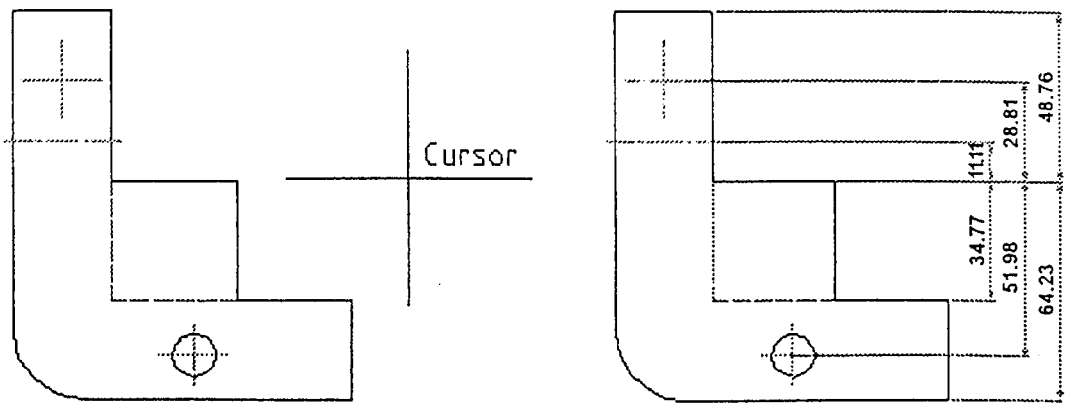
FIG. 3A illustrates dimensioning of an L-shaped object in dependence of the position of the pointing means (cursor)
Figure 3B:
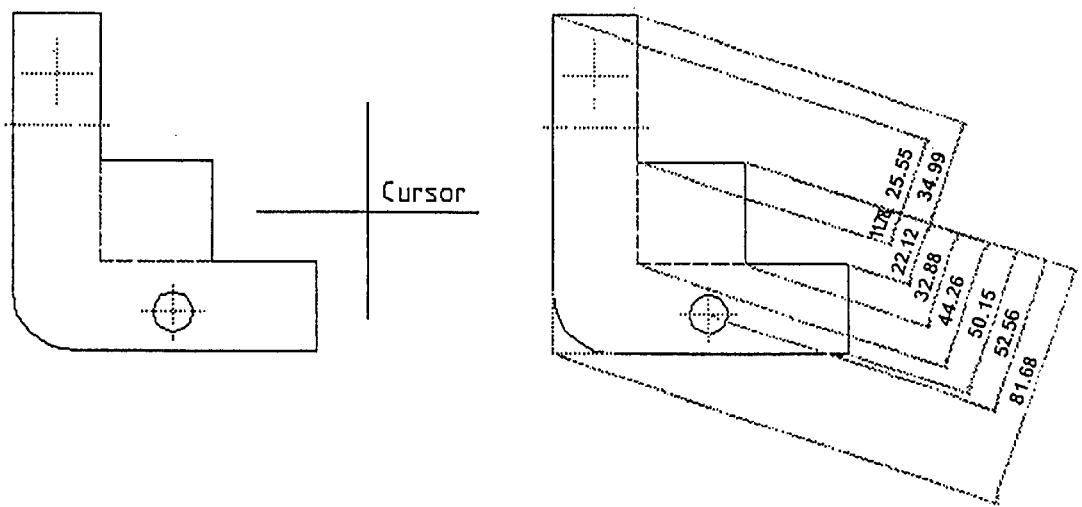
FIG. 3B illustrates dimensioning of the L-shaped object after moving the pointing means (cursor)

In order to be able to distinguish the preliminary dimensioning and the final dimensioning, the former is preferably displayed in a different gray scale level or in a different color (see FIG. 3A, FIG. 3B). In this way the user always sees whether he can still change the preliminary dimensioning by moving the pointing means, this is to say whether the method is in step 20 or 22 or whether the method has already been finished.

According to another preferred embodiment, the method steps 18 and 20 are combined such that each dimensioning element to be drawn, like, for example, a dimension or auxiliary line, is immediately displayed on the display device even before a further dimensioning element is calculated. If the user moves the pointing means, method steps 18 and 20 are aborted and the method is continued at step 14. Since dimension and auxiliary lines are calculated and displayed first, then arrowheads and finally dimensions, the user can determine quickly whether or not the dimensioning will conform to his expectations and can influence the preliminary dimensioning by moving the pointing means.

Figure 2:
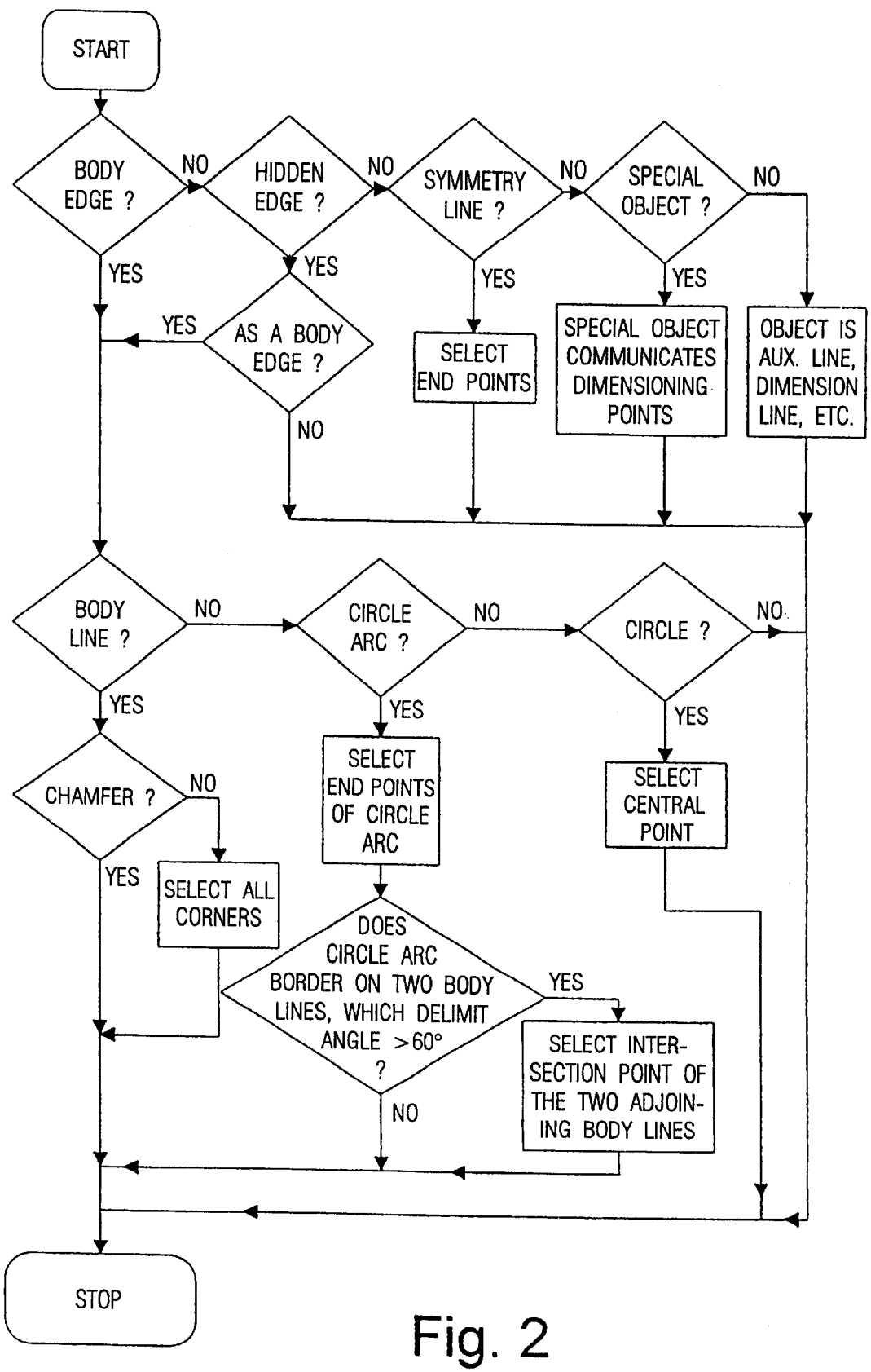
FIG. 2 is a decision diagram further explaining the selection of the contour points, i.e. the possible points to be dimensioned.

Now the determination of the contour points in method step 12 will be explained in more detail with reference to FIG. 2. It has already been mentioned above that data objects may be grouped. Also the selection of the graphical objects to be dimensioned in method step 8 may be considered as a data object group. The method in FIG. 2 has to be applied to each data object selected in method step 8. If a data object in the selection is a data object group, then the method of FIG. 2 is applied in turn to all data objects of this group. In the end the method shown in FIG. 2 is applied to all data objects which directly or indirectly via data object groups belong to the selection.

In FIG. 2 it is first distinguished whether the data object represents a "body edge", a "hidden edge", a "symmetry line" or a "special object". If the data object is a "body edge", it is further distinguished whether the data object is a "body line", a "circle arc" or a "circle". For "body lines" all corners are counted as contour points. In the preferred embodiment, however, corners which border on chamfers will not be dimensioned and therefore also not added to the contour points. In another preferred embodiment also corners which border on chamfers will be added to the possible points to be dimensioned. The corresponding dimension line is labeled in this preferred embodiment not only with the depth of the chamfer, but also with the associated angle.

If a "body edge" represents a "circle arc", the end points of the "circle arc" are considered as contour points. If the "circle arc" borders on two "body lines", which delimit an angle larger than 60°, then the intersection point of the two adjoining "body lines" is further considered as a contour point. For "body edges" which form "circles", the central point is added to the contour points.

If the data object is not a "body edge", it is tested whether or not the data object is a "hidden edge". In the preferred embodiment of the present invention it is stored as an option whether or not "hidden edges" will be processed as "body edges". The change of options takes place by methods which can be performed independently of the method of the invention in FIG. 1.

If the data object is not a "hidden edge", it is tested whether or not the data object is a "symmetry line". For "symmetry lines" the end points are added to the possible points to be dimensioned. However, "symmetry lines" are only dimensioned in fact if they run in parallel with the direction of dimensioning. Since the direction of dimensioning depends on the position of the pointing means, it can only be determined in step 16 whether or not the "symmetry line" will actually be dimensioned.

If the data object is not a "symmetry line" either, it is tested whether or not the data object is a special object. The category "special object" mainly serves as an linking point for extensions of the decision structure shown in FIG. 2. Special objects themselves have methods which are able to inform the methods of the invention shown in FIG. 1 which points are to be added to the contour points. Screws, nuts and threads are named here as examples for special objects to be dimensioned.

Data object groups can also be considered as special objects. In this case the method which communicates the contour points to the method of the invention of FIG. 1 can be described by the fact that the method of FIG. 2 is applied to all data objects belonging to the group.

If the data object is not a "special object" either, it must be a data object which will not be dimensioned. Examples for such objects are auxiliary lines, dimension lines, tolerances and text.

The decision diagram shown in FIG. 2 serves for an easier understanding of the present invention and not necessarily depicts the underlying programming. If the method of the invention is to be implemented in an object oriented programming environment, a parent class "CDataObject" would be defined. The parent class "CDataObject" comprises, among others, the methods "Draw" and "Points". The method "Draw" displays the class "CDataObject" on the display device. The method "Points" determines all contour points of the data object. The methods "Draw" and "Points" are preferably defined as virtual ones. Child classes "CBodyLine", "CCircleArc", "CCircle" and so on are derived from the parent class "CDataObject". The child classes also comprise the methods "Draw" and "Points". Since each class and therefore each object (instance) now has the method "Points", the selection in the decision diagram in FIG. 2 regarding the graphical object which represents the data object is no longer necessary.

This selection can also be avoided in a programming environment which only supports structured programming. In contrast to classes, structures cannot comprise methods. This disadvantage, however, is alleviated by the fact that structures may comprise pointers to methods. For the data objects "body line", "circle arc", "circle" and so on, the structures "SBodyLine", "SCircleArc", "SCircle" and so on are defined. Further the methods "BodyLinePoint", "CircleArcPoint", "CirclePoint" and so on are defined, which for each data structure determine the corresponding contour points. Each method expects a pointer to the corresponding data structure as an input for determining the possible points to be dimensioned. Vice versa, each data structure comprises a pointer to the corresponding method in order to render the selection of the correct method superfluous.

Figure 4:
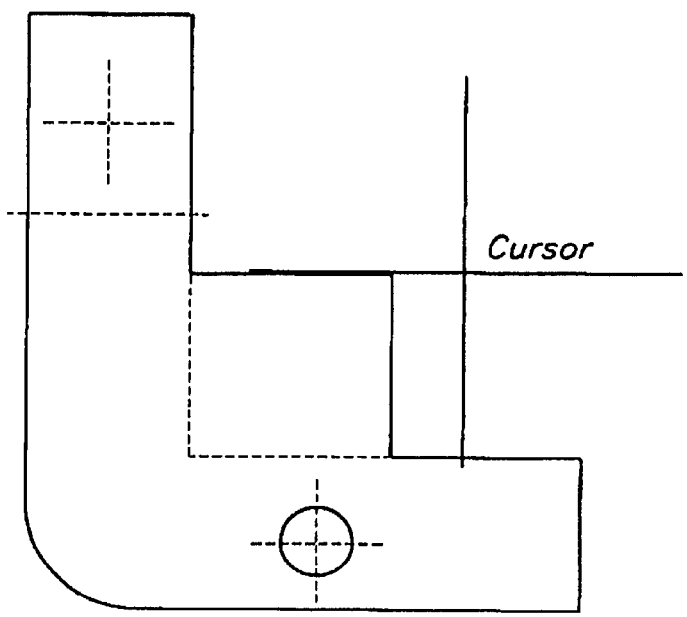
FIG. 4 illustrates a limited dimensioning of the L-shaped object in dependence of the position of the pointing means (cursor)
Figure 4:
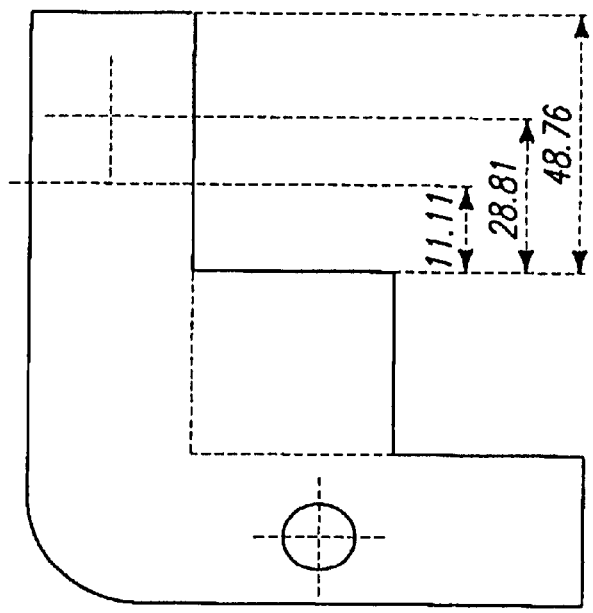

FIGS. 3A, 3B and 4 explain the influence of the position of the pointing means with respect to the object to be dimensioned. Besides the position of the pointing means, its velocity on the display device may influence the dimensioning. Whether or not position and/or velocity of the pointing means have an influence, and which kind of influence they have, is stored as an option. In FIG. 3A the position of the pointing means (cursor) with respect to the L-shaped object to be dimensioned first determines the dimensioning direction, wherein in the preferred embodiment only four dimensioning directions are available during the first execution of method step 14: horizontally to the left, horizontally to the right, vertically up and vertically down. With respect to FIG. 3A, this means that the auxiliary lines horizontally run to the right from the object to be dimensioned. In FIG. 3A the auxiliary line closest to the pointing means is determined as starting point of the dimension lines. Finally the pointing means also determines the distance of the dimension lines from the drawing to be dimensioned within the framework of applicable standards.

In another embodiment a vector from a well-defined point of the drawing to be dimensioned to the pointing means could determine the direction of dimensioning, i.e. the direction of the auxiliary lines. Preferably the area's center of gravity could be used as well-defined point of the drawing to be dimensioned.

FIG. 3B shows the influence of a downward movement of the pointing means on the dimensioning. Because of the movement of the pointing means, the direction of dimensioning changes from "horizontally to the right" to "towards bottom right". Here, the starting point of the dimensioning remains unchanged in the preferred embodiment. The distance of the dimension lines from the graphical objects to be dimensioned can be changed by changing the position of the pointing means only within the limits set by the applicable standards. In FIG. 3B the symmetry cross, which is located in the upwards pointing leg of the object to be dimensioned, will not be dimensioned since the horizontal symmetry line is no longer parallel to the direction of dimensioning.

The position of the pointing means may further be used for influencing the selection of the graphical objects to be dimensioned in method step 8, if the corresponding choice of options is made or certain keys are pressed at the same time. In FIG. 4, for example, only those points are dimensioned which are located above the auxiliary line which defines the starting point of the dimensioning. Certain contour points are excluded from the dimensioning in method step 16, preferably by pressing one of the four cursor keys. Each cursor key selects one half of the drawing with respect to the pointing means. The cursor key "upwards", for example, selects the half plane above the pointing means. The number block may be used as an alternative to the cursor keys. Here the numbers 2, 4, 6 and 8 have a functionality corresponding to that of the cursor keys. The numbers 1, 3, 7 and 9 select a quadrant. For example, the number 1 selects the quadrant to the left and above the pointing means. The selection of part of the contour points is canceled again by pressing the number 5. In this manner the complete original selection is dimensioned again.

Figure 5:
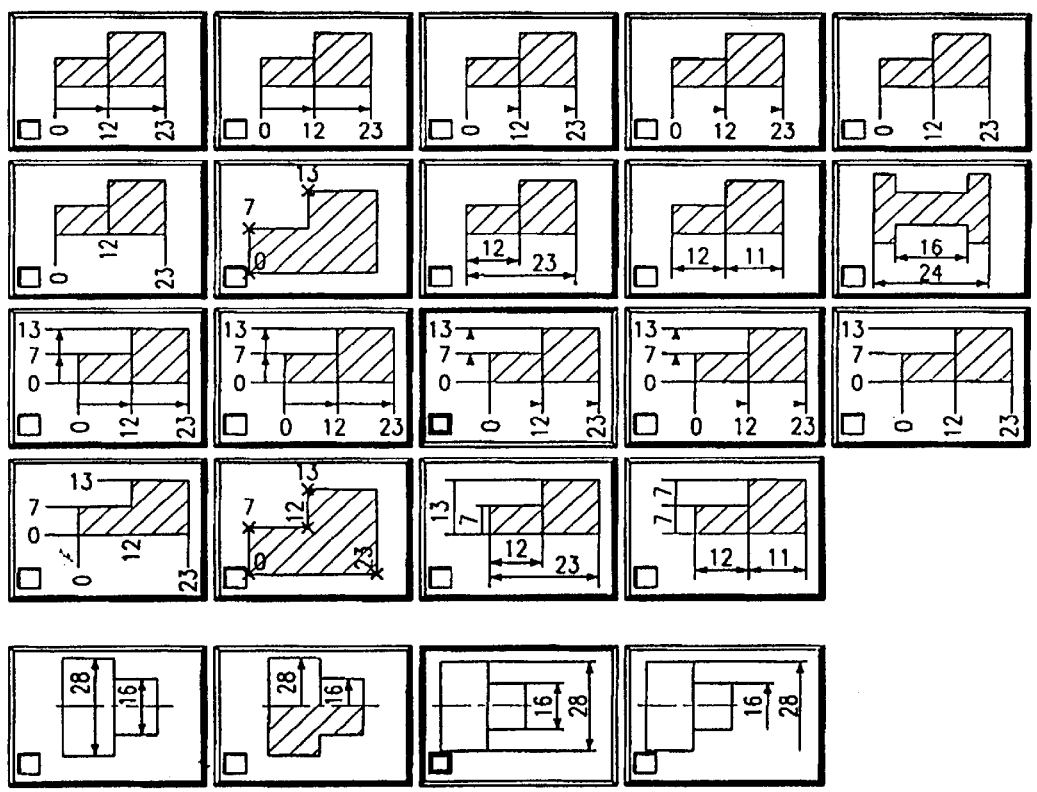
FIG. 5 illustrates a selection menu for different dimensioning styles like linear dimensioning, ordinate dimensioning, symmetry dimensioning or dimensioning of a shaft in one or more axes.

FIG. 5 shows a menu with 19 different dimensioning styles for linear dimensioning, ordinate dimensioning or symmetry dimensioning. The dimensioning can be carried out either in horizontal or vertical or in horizontal and vertical direction. A dimensioning style is selected by clicking the corresponding icon (switching region with picture) using the pointing means. The selected dimensioning style is preferably indicated by coloring the top and the left margin of the icon and a small square in the lower left corner of the icon in a dark color. Furthermore, four dimensioning styles for dimensioning of a shaft are shown in FIG. 5. After clicking an icon for a dimensioning style the dimensioning menu is closed.

The selection of the graphical objects to be dimensioned and thereby the selection of corresponding data objects in method step 8 can take place in different ways. In the preferred embodiment the pointing means is dragged over the display while pressing a key at the same time, and thus a rectangle is defined. The positions of the pointing means when the key is pressed and released define two corners of a rectangle. All data objects that are situated completely inside the rectangle are selected. When data object groups are concerned, all data objects belonging to this group must be situated completely inside the defined rectangle.

By pressing another key the drawing next to the pointing means on the display device is selected. Here, first that data object is determined which comprises a part being especially close to the pointing means. The drawing associated with this data object is dimensioned.

By running the pointing means so that it defines a closed area while a third key is held depressed, those data objects are selected which are located completely inside the closed area. In case the path of the pointing means, which has been covered while the third key was pressed, happens not to be closed, the two points are connected at which the pointing means was situated when the third key was pressed and released, such that a closed area results.

In another preferred embodiment, all data objects are selected which are located at least in part in the closed area. This is also so for the rectangle defined by means of the first key and the pointing means.

By pressing a fourth key, all elements of the drawing sheet which is at least partially displayed on the display device are selected. The drawings on all pages which belong to a folder or a project can be selected by pressing further keys.

The selection step in method step 8 can be modified by setting other options such that the selection takes place automatically. Those data objects of a drawing can be selected automatically which are located closest to the pointing means on the display screen. Furthermore, all drawings shown on the display device can be selected automatically. Further, all drawings of a sheet or all sheets of a project can be selected automatically. If everything is selected, this selection step may be interpreted in a way that it does not take place.

After the user has indicated his agreement with the preliminary dimensioning in method step 26, the final dimensioning is determined and displayed. The final dimensioning preferably consists of a plurality of auxiliary lines, dimension lines and dimension figures. The dimensioning object therefore is a data object group. The dimensioning object is finally stored with the other objects of the sheet or project which is presently displayed. The project currently processed in the CAD system is preferably contained in the working memory. Only in response to a special command of the user the older version of the project is updated in the non-volatile mass memory of the computer. In the case of an extensive object, only part of the data objects are loaded into the working memory, the remaining ones, for example, are dislocated as a temporary file onto the mass memory. The temporary file permits to undo changes.

As an alternative, extensive projects may advantageously be managed with the help of data bases. Here a record of the data base preferably contains a data object. If the memory space of a record is changeable, a record may also comprise a data object group, i.e. several data objects. As an alternative, data object groups may also be formed by references to other data objects. It is not necessary that the data base is located completely on a computer. If the computer is connected to a network, the data objects of a project may be stored on several computers in a distributed way and may be edited by several users at the same time.

What is claimed is:

1. A method for creating a dimensioning object for at least one data object, wherein both said dimensioning object and said data object are displayable on a display device as graphical objects, wherein said method comprises:
 (a) obtaining a data object to be dimensioned;
 (b) applying dimensioning rules, that have been pre-defined to determine elements of the data object that will be dimensioned, to create a dimensioning object for said data object;
 (c) displaying said dimensioning object on said display device; and
 (d) storing said dimensioning object with said data object.

2. The method of claim 1, wherein a selection from all data objects is made before applying said dimensioning rules, and that said dimensioning object only comprises dimensionings for the selected data objects.

3. The method of claim 2, wherein said selection of data objects is made using a pointing means, wherein only data objects may be selected which are also displayed on said display device at least in part.

4. The method of claim 1, wherein said dimensioning object is stored with said data object as different entries in a data base.

5. The method of claim 1, wherein applying dimensioning rules further comprises:
 determining all contour points of said data object,
 determining the points to be dimensioned for said data object.

6. The method of claim 5, wherein the determining of all countour points and determining of points to be dimensioned are repeated cyclically until a user input takes place.

7. The method of claim 6, wherein said cyclical repetition is only resumed in response to a movement of the pointing means exceeding a threshold value with respect to distance or speed.

8. The method of claim 1, wherein said predefined dimensioning rules consider said data object and the position and/or the movement of a pointing means.

9. The method of claim 8, wherein a representation of said pointing means on said display device defines a dimensioning direction and a distance of dimensioning from the data object by its relative position with respect to said graphical object.

10. The method of claim 8, wherein said pointing means is a cursor, controllable by a mouse device.

11. The method of claim 1, wherein, subsequent to said displaying of said dimensioning object, a user input takes places, and in dependence on said user input, said displayed dimensioning object disappears from said display device.

12. The method of claim 1, wherein said displaying of said dimensioning object shows a preliminary dimensioning and is completed to form a final dimensioning in response to a user confirmation.

13. The method of claim 1, wherein a dimensioning style is selected from a plurality of dimensioning styles, wherein at least part of the selectable dimensioning styles are shown on said display device for selection.

14. The method of claim 13, wherein said dimensioning styles comprise linear dimensioning, ordinate dimensioning, symmetry dimensioning and dimensioning of a shaft, and that the dimensioning selectably takes place in a direction selected from a group comprising: horizontal, vertical, and both horizontal and vertical.

15. The method of claim 1, further comprising determining whether one or more possible points to be dimensioned on the object to be dimensioned are associated with one of the classes "body edge", "symmetry line", "hidden edge" and "special object".

16. The method of claim 15, wherein, for a symmetry line, end points are added to the possible points to be dimensioned.

17. The method of claim 15, wherein symmetry lines are only dimensioned if they are parallel to the direction of dimensioning.

18. The method of claim 15, wherein a hidden edge is processed like a body edge, when selected correspondingly.

19. The method of claim 15, wherein a special object determines its possible points to be dimensioned itself.

20. The method of claim 15, wherein a point which is located closest to the dimensioning is selected from several possible points to be dimensioned which would show the same dimension value.

21. The method of claim 15, wherein end points of radii are only dimensioned if the tangential direction in this point is parallel to the direction of dimensioning.

22. The method of claim 15, wherein chamfers are not dimensioned.

23. A computer-implemented system for creating a dimensioning object for at least one data object, wherein both said dimensioning object and said data object are displayable as graphical objects on a display device coupled to the computer system, comprising:
 (a) means, performed by the computer system for obtaining a data object to be dimensioned;
 (b) means, performed by the computer system, for applying dimensioning rules, that have been pre-defined to determine elements of the data object that will be dimensioned, to create a dimensioning object for said data object;
 (c) means, performed by the computer system, for displaying said dimensioning object on said display device; and
 (d) means, performed by the computer system, for storing said dimensioning object with said data object.

24. The system of claim 23, wherein a selection from all data objects is made before applying said dimensioning rules, and that said dimensioning object only comprises dimensionings for the selected data objects.

25. The system of claim 24, wherein said selection of data objects is made using a pointing means, wherein only data objects may be selected which are also displayed on said display device at least in part.

26. The system of claim 23, wherein said dimensioning object is stored with said data object as different entries in a data base.

27. The system of claim 23, wherein said means for applying dimensioning rules further comprises:
 means for determining all contour points of said data object; and
 means for determining the points to be dimensioned for said data object.

28. The system of claim 27, wherein the means for determining all countour points and means for determining points to be dimensioned are configured to cyclically repeat determining until a user input takes place.

29. The system of claim 28, wherein said cyclical repetition is only resumed in response to a movement of the pointing means exceeding a threshold value with respect to distance or speed.

30. The system of claim 23, wherein said predefined dimensioning rules consider said data object and the position and/or the movement of a pointing means.

31. The system of claim 30, wherein a representation of said pointing means on said display device defines a dimensioning direction and a distance of dimensioning from the data object by its relative position with respect to said graphical object.

32. The system of claim 30, wherein said pointing means is a cursor controllable by a mouse device.

33. The system of claim 23, wherein, subsequent to said displaying of said dimensioning object, a user input takes places, and in dependence on said user input, said displayed dimensioning object disappears from said display device.

34. The system of claim 23, wherein said means for displaying said dimensioning object comprises means for showing a preliminary dimensioning and means for completing to form a final dimensioning in response to a user confirmation.

35. The system of claim 23, wherein a dimensioning style is selected from a plurality of dimensioning styles, wherein at least part of the selectable dimensioning styles are shown on said display device for selection.

36. The system of claim 35, wherein said dimensioning styles comprise linear dimensioning, ordinate dimensioning, symmetry dimensioning and dimensioning of a shaft, and that the dimensioning selectably takes place in a direction selected from a group comprising: horizontal, vertical, and both horizontal and vertical.

37. The system of claim 23, further comprising means for determining whether one or more possible points to be dimensioned on the object to be dimensioned are associated with one of the classes "body edge", "symmetry line", "hidden edge" and "special object".

38. The system of claim 37, wherein, for a symmetry line, end points are added to the possible points to be dimensioned.

39. The system of claim 37, wherein symmetry lines are only dimensioned if they are parallel to the direction of dimensioning.

40. The system of claim 37, wherein a hidden edge is processed like a body edge, when selected correspondingly.

41. The system of claim 37, wherein a special object determines its possible points to be dimensioned itself.

42. The system of claim 37, wherein a point which is located closest to the dimensioning is selected from several possible points to be dimensioned which would show the same dimension value.

43. The system of claim 37, wherein end points of radii are only dimensioned if the tangential direction in this point is parallel to the direction of dimensioning.

44. The system of claim 37, wherein chamfers are not dimensioned.

45. An article of manufacture embodying instructions that when executed by a computer cause the computer to perform a method for creating a dimensioning object for at least one data object, wherein both said dimensioning object and said data object are displayable on a display device as graphical objects, wherein said method comprises:

(a) obtaining a data object to be dimensioned;

(b) applying dimensioning rules, that have been predefined to determine elements of the data object that will be dimensioned, to create a dimensioning object for said data object;

(c) displaying said dimensioning object on said display device; and (d) storing said dimensioning object with said data object.

46. The article of manufacture of claim 45, wherein a selection from all data objects is made before applying said dimensioning rules, and that said dimensioning object only comprises dimensionings for the selected data objects.

47. The article of manufacture of claim 46, wherein said selection of data objects is made using a pointing means, wherein only data objects may be selected which are also displayed on said display device at least in part.

48. The article of manufacture of claim 45, wherein said dimensioning object is stored with said data object as different entries in a data base.

49. The article of manufacture of claim 45, wherein applying dimensioning rules further comprises:

determining all contour points of said data object, determining the points to be dimensioned for said data object.

50. The article of manufacture of claim 49, wherein the determining of all countour points and determining of points to be dimensioned are repeated cyclically until a user input takes place.

51. The article of manufacture of claim 50, wherein said cyclical repetition is only resumed in response to a movement of the pointing means exceeding a threshold value with respect to distance or speed.

52. The article of manufacture of claim 45, wherein said predefined dimensioning rules consider said data object and the position and/or the movement of a pointing means.

53. The article of manufacture of claim 52, wherein a representation of said pointing means on said display device defines a dimensioning direction and a distance of dimensioning from the data object by its relative position with respect to said graphical object.

54. The article of manufacture of claim 45, wherein said pointing means is a cursor controllable by a mouse device.

55. The article of manufacture of claim 45, wherein, subsequent to said displaying of said dimensioning object, a user input takes places, and in dependence on said user input, the method causes said displayed dimensioning object to disappear from said display device.

56. The article of manufacture of claim 45, wherein said displaying of said dimensioning object shows a preliminary dimensioning and is completed to form a final dimensioning in response to a user confirmation.

57. The article of manufacture of claim 45, wherein a dimensioning style is selected from a plurality of dimensioning styles, wherein at least part of the selectable dimensioning styles are shown on said display device for selection.

58. The article of manufacture of claim 57, wherein said dimensioning styles comprise linear dimensioning, ordinate dimensioning, symmetry dimensioning and dimensioning of a shaft, and that the dimensioning selectably takes place in a direction selected from a group comprising: horizontal, vertical, and both horizontal and vertical.

59. The article of manufacture of claim 45, the method further comprising determining whether one or more possible points to be dimensioned on the object to be dimensioned are associated with one of the classes "body edge", "symmetry line", "hidden edge" and "special object".

60. The article of manufacture of claim 59, wherein, for a symmetry line, end points are added to the possible points to be dimensioned.

61. The article of manufacture of claim 59, wherein symmetry lines are only dimensioned if they are parallel to the direction of dimensioning.

62. The article of manufacture of claim 59, wherein a hidden edge is processed like a body edge, when selected correspondingly.

63. The article of manufacture of claim 59, wherein a special object determines its possible points to be dimensioned itself.

64. The article of manufacture of claim 59, wherein a point which is located closest to the dimensioning is selected from several possible points to be dimensioned which would show the same dimension value.

65. The article of manufacture of claim 59, wherein end points of radii are only dimensioned if the tangential direction in this point is parallel to the direction of dimensioning.

66. The article of manufacture of claim 59, wherein chamfers are not dimensioned.

* * * * *

UNITED STATES PATENT AND TRADEMARK OFFICE
CERTIFICATE OF CORRECTION

PATENT NO. : 6,281,907 B1
DATED : August 28, 2001
INVENTOR(S) : Georg Baumann

It is certified that error appears in the above-identified patent and that said Letters Patent is hereby corrected as shown below:

<u>Column 12,</u>
Line 22, after "claim, "45" should read -- 52 --

Signed and Sealed this

Twenty-sixth Day of November, 2002

Attest:

Attesting Officer

JAMES E. ROGAN
*Director of the United States Patent and Trademark Office*